Aug. 25, 1964  M. MILLHEISER  3,145,611
QUICK-ACTING BOLT AND NUT TYPE FASTENER HAVING
CONTRACTIBLE BOLT-GRIPPING SLEEVE
Filed April 22, 1960  2 Sheets-Sheet 2

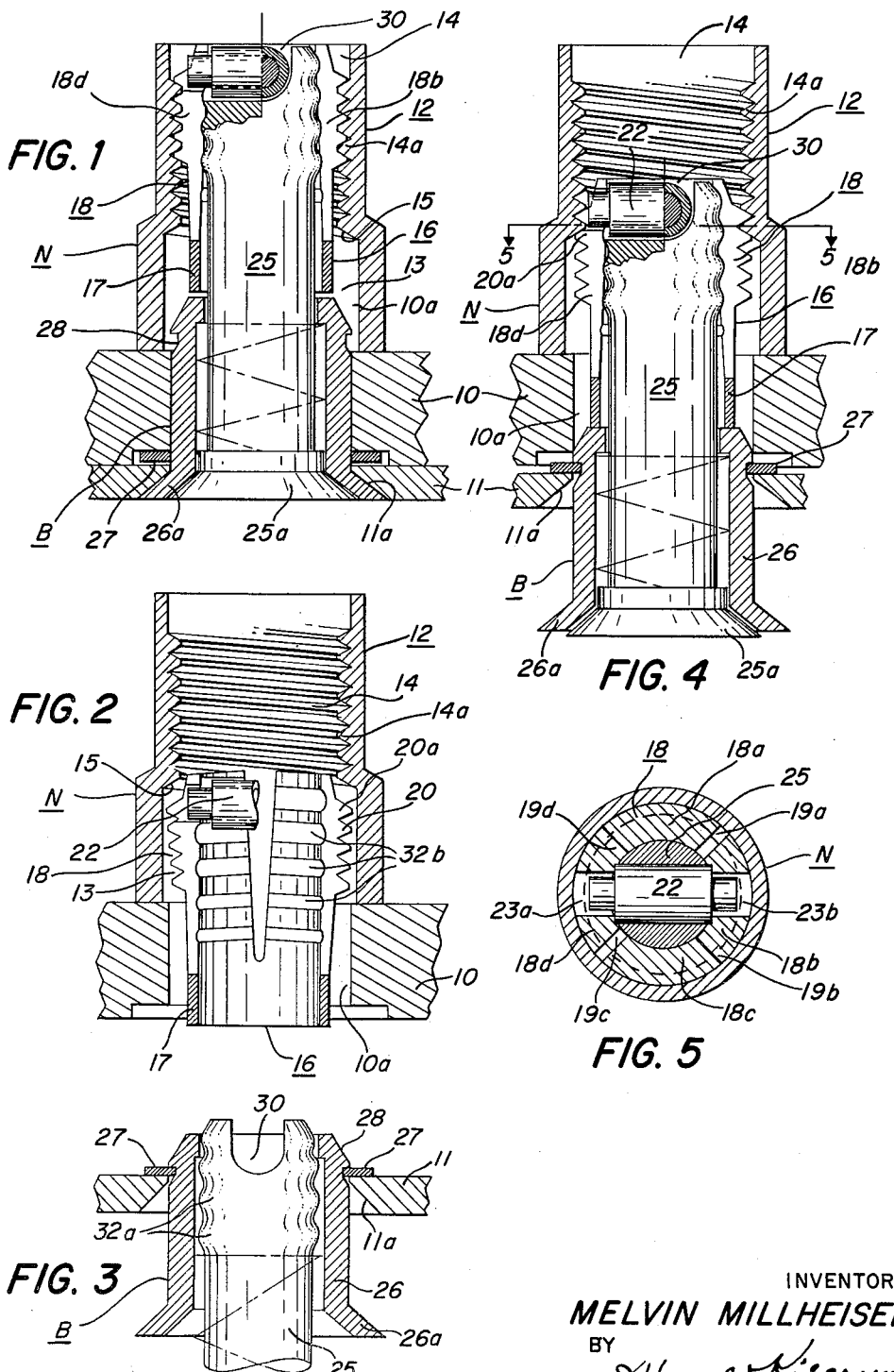

INVENTOR
MELVIN MILLHEISER
BY
ATTORNEY

United States Patent Office 3,145,611
Patented Aug. 25, 1964

3,145,611
QUICK-ACTING BOLT AND NUT TYPE
FASTENER HAVING CONTRACTIBLE
BOLT-GRIPPING SLEEVE
Melvin Millheiser, Rockaway, N.Y., assignor to Waldes
Kohinoor, Inc., Long Island City, N.Y., a corporation
of New York
Filed Apr. 22, 1960, Ser. No. 23,968
7 Claims. (Cl. 85—1)

This invention relates to improvements in quick-acting bolt and nut-type fasteners, and more particularly to an improved quick-acting fastener of the stated type designed for and having particular utility in releasably securing sheets, plates, panels and the like in tight face engagement.

Broadly stated, the invention contemplates and aims to provide an effective and thoroughly dependable bolt and nut-type fastener for use in releasably securing sheets, plates, panels and the like in tight face engagement with but a small number of turns of the bolt or stud member of the fastener and which is further characterized by simple, inexpensive construction as compared to known fasteners serving similar function.

A more particular object of the invention is the provision of a quick-acting bolt and nut-type fastener as aforesaid, which is characterized by a non-threaded bolt and a nut therefor which is operable to positively grip and axially translate said bolt, thereby to secure the plates, sheets, panels and the like with which said bolt and nut members are assembled, responsively to but simple axial insertion of the bolt into the nut opening followed by a limited number of turns of the bolt.

Another object of the invention is the provision of an improved quick-acting bolt and nut-type fastener for securing plates, sheets, panels and the like in tight face engagement, which is characterized by a non-threaded bolt and a nut which incorporates a normally inactive bolt-gripping means whose construction and arrangement is such that it is contractible to releasably grip and draw the bolt inwardly thereinto upon the latter being simply inserted into the nut opening and given a limited number of turns.

A still further object of the invention is the provision of a bolt and nut-type fastener for releasably securing plates, sheets, panels and the like in tight face engagement, which is characterized by a non-threaded bolt and a simplified yet thoroughly dependable form of a contractible segmental nut for securely gripping the bolt and forcibly drawing it thereinto upon said bolt being simply pushed into and given a few turns relative to said nut.

The above and other objects and features of advantage of the improved bolt and nut-type fastener according to the present invention will appear from the following detailed description thereof, taken with the accompanying drawings illustrating alternate but not necessarily the only physical forms which said fastener may take, in which—

FIG. 1 is a longitudinal section taken through the fastener of the invention in the fully secured position thereof, it being noted that the inner ends of both bolt and complemental nut sleeve are shown in quarter section;

FIG. 2 is a similar longitudinal section taken through the nut assembly of the herein proposed fastener;

FIG. 3 is a similar lonigtudinal section taken through the bolt and shear sleeve assembly of said fastener;

FIG. 4 is a longitudinal section view generally similar to FIG. 1, but illustrating the bolt and nut-sleeve parts at the beginning of their common turning movement;

FIG. 5 is a section taken along line 5—5 of FIG. 4;

Figure 6:
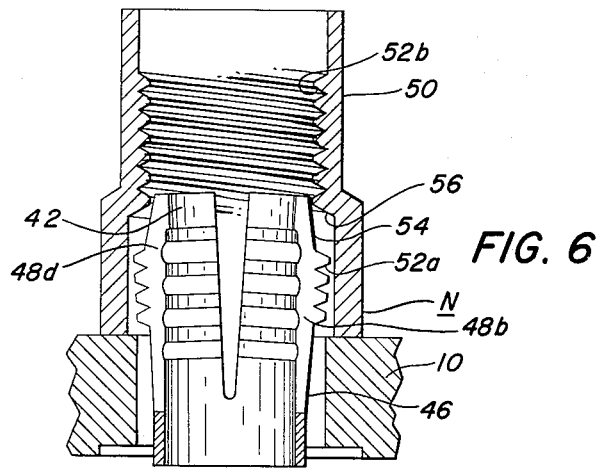
FIGS. 6 and 7 are sectional views corresponding to FIGS. 2 and 3, respectively, which illustrate a somewhat modified bolt and nut fastener according to the invention.

Referring to the drawings in greater detail, FIG. 1 illustrates a fastener as herein proposed in its intended application of providing a quick-acting, releasable securing means for securing the plates or panels 10, 11 in tight face engagement, of which panel 10 may be considered the inner and panel 11 the outer panel of the connected assembly. Said panels are respectively provided with fastener-receiving openings 10a and 11a and, as is conventional, the panel 10 mounts on its relatively inner face a so-called blind nut or, more properly, the nut assembly N of the fastener, and the panel 11 carries or mounts on its relatively outer face the bolt element of the fastener, herein the bolt assembly designated B.

Referring to FIG. 2, the aforesaid nut assembly N comprises a tubular nut housing 12 which is suitably disposed to the relatively rearward face of the panel 10 in generally coaxial relation with the opening 10a of the latter, said housing having a large-diameter, forward-end bore portion 13 which is normally non-threaded and a rearward smaller-diameter, internally threaded bore portion 14, said bore portions being connected by an inclined step 15 whose function will be explained later. Operative within the nut housing and constituting a component of said nut assembly is a nut sleeve generally designated 16 which is of contractible, segmental construction, that is to say, whereas the forward (lower in FIG. 2) end 17 of said sleeve is formed as a continuous closed ring, its main body portion designated 18 is of segmental construction, being divided into several (four being illustrated) axially extending segments 18a, 18b, 18c, 18d, as by axial slits 19a, 19b, 19c, 19d (FIG. 5) which start at said closed ring and open through the other end of said sleeve. It is also to be noted that said slitted main body portion of the sleeve is normally expanded with respect to its closed-ring end portion 17, with the result that the sleeve segments 18a–18d inclusive are spread radially outwardly with respect to said closed ring portion to a diameter closely approaching that of the large-diameter inner end 13 of the nut housing 12. It will be understood that the radial outward spreading of the sleeve segments is further such as to result in the rearward end of the sleeve normally having somewhat greater diameter than that of the panel opening 10a, whereby full axial separation of the sleeve 16 from the nut housing 12 through said panel opening is positively prevented. The slitted or segmental end of said nut sleeve 16 is also externally threaded as at 20, and said threads are adapted to threadably interengage with the internal threads 14a provided in the smaller-diameter bore portion 14 of said nut housing. It is noted at this point that both the external sleeve threads and the internal nut housing threads have exceedingly coarse pitch, and that the number of threads provided in the nut sleeve is relatively small, i.e. five such threads being shown but this number may be even smaller.

At its extreme rearward (larger-diameter) end, said nut sleeve 16 mounts a cross pin 22 which extends diametrically across the sleeve and is secured thereto as by means of its reduced ends being journaled in a pair of diametrically opposed openings 23a, 23b which are provided in two opposite sleeve segments.

Referring to FIG. 3, the bolt assembly B comprises a bolt or stud proper 25 operating within a coaxial shear sleeve 26 which extends through the panel opening 11a and is held captive to the panel 11 as by means of a retaining ring 27 adapted to spring-seat itself in a circumferential groove 28 provided in the outer periphery of said shear sleeve adjacent its inner (rearward) end when said sleeve is moved to its fully extended position with respect to its panel, in which it is shown in both FIGS. 3 and 4. Said bolt 25 is provided at its relatively outer end with an enlarged diameter tapered head 25a as is conventional, said head fitting into a correspondingly tapered outer-end enlargement 26a of the shear sleeve which serves to limit the inward movement of the shear sleeve with respect to panel, as is also usual.

At its inner (relatively rearward) end the bolt 25 is provided with an open-sided cross slot 30 of width and depth as to freely receive the aforesaid cross pin 22. Accordingly, the inner end of the bolt may be forked over the cross pin 22 of the nut sleeve 16 whereupon said pin and slot provide a quick make-and-break coupling between the bolt and the sleeve for transmitting both rotary motion and initial axial movement of the bolt to said nut sleeve.

The operation of the fastener will now be briefly described. Normally, the nut assembly components are arranged as illustrated in FIG. 2; that is to say, the nut sleeve 16 by the prior bolt-releasing operation is positioned with its expanded segmental end contained in the large-diameter bore portion 13 of the nut housing and hence axially without the threaded bore portion 14 thereof, and the bolt assembly parts are in their position as generally shown in FIG. 3, in which both the shear sleeve 26 and the bolt or stud proper 25 are in their fully retracted position. Such relationship of fastener parts permits the plates or panels 10, 11 to be brought into substantial face engagement in which their respective fastener-receiving openings 10a, 11a are in alignment. Upon this relationship having been effected, the bolt 25 is pushed axially into the nut-sleeve 16 until its forked inner end straddles the cross pin of said sleeve. When such occurs, the bolt and sleeve are coupled for rotation in unison and the nut sleeve 16 will also be pushed inwardly into the nut housing 12 in response to initial inward thrust or push motion applied to the bolt. Assuming simultaneous initial inward push on the bolt as well as turning thereof, the innermost external thread 20a of the nut sleeve engages the inwardly converging step or shoulder 15 provided in the bore of the nut housing as aforesaid, such resulting in the sleeve segment 18a–18d being contracted radially inwardly to the extent that the external sleeve threads 20 mate with the internal threads 14a of the smaller-diameter bore portion 14 of the nut housing. When this mating relationship is established, but a relatively few turns of the bolt 25 will effect its axial translation, together with that of the nut and shear sleeves, to the fully secured position of the fastener shown in FIG. 1, it being noted that in said position the inner end of the shear sleeve is disposed closely adjacent the closed-ring outer end 17 of said nut sleeve.

In the design of the fastener, the nut sleeve 16, when contracted, will be provided with an inner diameter such that it firmly grips the end of the bolt which it encircles. To insure maximum grip of sleeve on bolt as aforesaid, the latter although non-threaded is provided adjacent its relatively inner end with a plurality, say three or four, of circumferential ribs or bulges 32a and the inner bore surface of the sleeve towards its relatively inner end is provided with complemental, shallow grooves 32b. Thus, when the sleeve is contracted as in FIGS. 1 and 4, the grooves and ribs effect interlocking of sleeve and bolt with one another, with the result that the bolt 25 is held against axial separation from the sleeve by an exceedingly high gripping force.

To dismantle or break the fastener, it is necessary only to turn the bolt 25 a few times in the opposite direction from which it was turned in making the fastening. Such results in the nut sleeve 16 backing itself outwardly from the threaded end of the nut housing 12 whereupon the sleeve segments 18a–18d inclusive spring apart when free to do so. When such occurs, the bolt may be freely withdrawn from the nut, as also results in the shear sleeve 26 of the bolt assembly moving to its fully retracted position in which it is shown in FIG. 3. It is to be observed that when the nut sleeve retracts as aforesaid, it automatically pushes the shear sleeve 26 outwardly with respect to the inner panel 10 despite any considerable residual stresses that may have developed between the panels 10, 11, thus further facilitating full disconnection of said panels.

The expansible and contractible nature of the nut-sleeve 18 provides yet another important advantage to the fastening as a whole. In explanation, even when said sleeve is contracted to its bolt-gripping status as in FIG. 1, its segments tend to expand to their original free or unstressed position shown in FIG. 2. As a result, the contracted segment exert a very strong, outwardly radial frictional gripping effect on the internal threads 14a of the nut housing 14, which substantially enhances the locking effect of the fastener as a whole.

Figure 7:
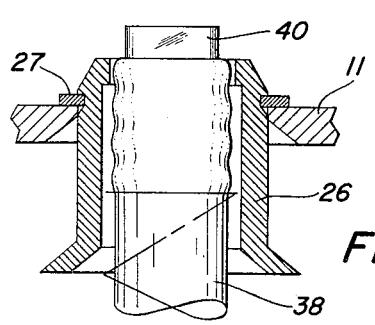
Figure 9:
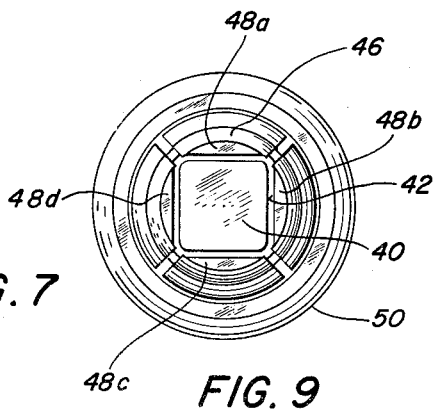
FIG. 9 is an inner-end view of the modified fastener according to FIG. 8.
Figure 8:
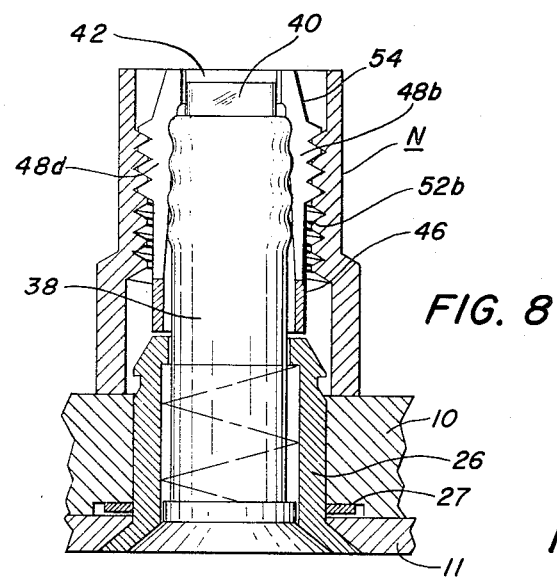
FIG. 8 is a longitudinal section of the modified fastener in the fully secured position thereof.

Referring to FIGS. 6–9 inclusive, such depict a modified bolt and nut-type fastener operating on the above described principle, and which differs from the FIGS. 1–5 fastener only in the form of separable coupling means provided between the inner end of the bolt and the nut sleeve. More particularly, the previously described pin and slot coupling (22, 30) is dispensed with, and in its place is substituted a coupling means comprising a non-round (preferably square) tip 40 on the inner end of the bolt 38 and a corresponding non-round (also preferably square-shaped) opening 42 therefor formed in the end wall of the nut sleeve 46. While said opening is somewhat oversize with respect to the bolt tip 40 when the nut-sleeve segments 48a, 48b, 48c and 48d are expanded as in FIG. 6, there is sufficient coaction between the square tip and walls of said opening 42 as enables the tip to rotate the sleeve within the nut housing 50 during initial rotation of the bolt, as brings about initial interengagement of the sleeve threads 52a with the nut housing threads 52b.

In addition to providing a simpler and at least equally effective coupling means between the bolt and nut sleeve, the form of coupling means according to FIGS. 6–9 has the further advantage of providing the necessary length for an elongated and hence less steeply inclined surface 54 on the inner end of the nut sleeve 46 for cooperation with the inclined step or shoulder 56 provided in the bore of the nut housing 50, than is possible with the sleeve and its cross-pin construction according to the FIGS. 1–5 of fastener. To explain this advantage, the elongated inclined surface 54 makes for a more gradual and therefore a more controlled contraction of the nut sleeve on to the bolt, and hence requires less axial force being applied to the bolt in initially bringing about interengagement of the sleeve and nut housing threads than with the FIGS. 1–5 construction.

Without further analysis, it will be appreciated that the above described and illustrated forms of bolt and nut-type fasteners each achieves the desirable objectives therefor as explained in the foregoing in simple and effective manner. However, it is to be understood that fasteners according to the invention are not limited to the exact structure illustrated but, on the other hand, may be changed or modified in structural detail to the extent that such changes or modifications would suggest themselves to persons skilled in the art. For example, the segments of the contractible sleeve may be formed entirely separate of one another and held together at one end as by an encircling ring or band, rather than extending integrally from a closed ring portion at one end of the sleeve as shown. So also, other forms of bolt-to-nut sleeve coupling means may be substituted without departing from the scope of the invention. Thus, it is intended that all matter contained in the above description or shown in the accompanying drawings shall be interpreted as illustrative and not in a limiting sense.

I claim:

1. A bolt and nut-type fastener for releasably securing panels and the like provided with bolt-receiving openings in tight face engagement comprising, in combination, a nut assembly coaxial with the opening of one panel and including a nut housing affixed to the rearward face of said one panel and having a forward large-diameter non-threaded bore portion and a coaxial rearward, internally threaded bore portion having smaller diameter than said non-threaded bore portion, and a bolt-receiving sleeve whose forward end portion has fixed internal diameter which is normally such as enables free insertion of a fastener bolt thereinto for substantially the full length of the sleeve, at least the rearward end portion of said sleeve comprising circumferentially spaced, axially extending segments and being provided with external threads adapted to interengage with the threads of said threaded bore portion and said rearward end portion further having an unstressed internal diameter greater than that of said forward end portion thereof and correspondingly of said fastener bolt and an unstressed external diameter greater than that of said threaded bore portion but said rearward end portion being contractible by virtue of its segmental construction to an external diameter substantially equal to that of such threaded bore portion and to an internal diameter corresponding substantially to that of the fastener bolt, said sleeve being disposed coaxial with said nut housing and having a normal axial position with respect thereto in which its externally threaded rearward end portion is contained in said large diameter, non-threaded bore portion and hence forwardly of said rearward threaded bore portion of said housing, a bolt freely insertible through the other panel opening and thence into said one panel opening and sleeve, coacting means on the rearward ends of said sleeve and bolt, respectively, and being also operative initially to transmit axial thrust imparted to the bolt to said sleeve, thereby to initiate rearward axial movement of the latter from the non-threaded into the threaded bore portion of that nut housing, and means responsive to such rotation and initial axial movement for effecting contraction of the segmental rearward end portion of the sleeve into the small-diameter threaded bore portion of the nut housing and into gripping engagement with the bolt within the sleeve, the construction and arrangement being such that continued rotation of the bolt effects axial translation of the sleeve into the threaded bore portion of the nut housing and corresponding axial movement of the bolt into said housing.

2. A fastener according to claim 1, wherein said sleeve-contracting means comprises an inwardly converging shoulder between the larger- and smaller-diameter bore portions of the housing against which said sleeve is adapted to contractingly engage in response to its initial movement aforesaid.

3. A fastener according to claim 1, wherein the bolt-to-sleeve coupling and driving connection comprises a cross-pin extending diametrically across the end of the sleeve and a slot extending transversely across the end face of the bolt which is adapted to accommodate said pin.

4. A fastener according to claim 1, wherein said contractible segmental sleeve comprises a generally sleeve-form member having its forward end portion formed and extending as a continuous closed ring and its said rearward end portion being provided with a plurality of circumferentially spaced, axially extending slots dividing said rearward end portion into a plurality of circumferentially spaced, axially extending segments as aforesaid, said segments being normally spread apart from one another by an amount providing said rear end portion with its aforesaid unstressed diameter.

5. A fastener according to claim 1, wherein the bolt-to-sleeve coupling and driving connection comprises a non-round tip on the inner end of the bolt and a complementally shaped opening in the corresponding inner end of the sleeve for the reception of said tip.

6. A fastener according to claim 1, including means for augmenting the gripping action of said sleeve on the bolt, said means comprising a plurality of circumferential ridges on the bolt and complemental grooves provided on the interengaging surface of the sleeve.

7. A fastener according to claim 1, wherein the sleeve-contracting means comprises an inclined step at the sleeve-entrance end to the threaded bore portion of the nut housing, against which the end of the contractible sleeve is adapted to contractingly engage when moved axially thereagainst.

References Cited in the file of this patent

UNITED STATES PATENTS

| | | |
|---|---|---|
| 1,738,969 | Selah | Dec. 10, 1929 |
| 2,592,698 | Hubbard | Apr. 15, 1952 |
| 2,755,699 | Forster | July 24, 1956 |
| 2,757,429 | Summers | Aug. 7, 1956 |
| 2,825,750 | Stockwell | Mar. 4, 1958 |